United States Patent
Tang

(10) Patent No.: US 11,678,720 B2
(45) Date of Patent: Jun. 20, 2023

(54) SHOCK ABSORPTION SHOE HAVING AT LEAST ONE INFLATABLE SHOCK ABSORPTION MODULE HIDDEN INSIDE THE SHOE IN WHICH AIR PRESSURE IS ADJUSTABLE

(71) Applicant: Lahui Tang, Guangdong (CN)

(72) Inventor: Lahui Tang, Guangdong (CN)

( * ) Notice: Subject to any disclaimer, the term of this patent is extended or adjusted under 35 U.S.C. 154(b) by 88 days.

(21) Appl. No.: 17/241,082

(22) Filed: Apr. 27, 2021

(65) Prior Publication Data

US 2021/0353003 A1    Nov. 18, 2021

(30) Foreign Application Priority Data

May 12, 2020   (CN) .......................... 202010393886.6

(51) Int. Cl.
*A43B 13/20*    (2006.01)
*A43B 13/30*    (2006.01)

(52) U.S. Cl.
CPC .......... *A43B 13/206* (2013.01); *A43B 13/203* (2013.01); *A43B 13/30* (2013.01)

(58) Field of Classification Search
CPC ....... A43B 7/148; A43B 13/181; A43B 13/20; A43B 13/203; A43B 13/206
See application file for complete search history.

(56) References Cited

U.S. PATENT DOCUMENTS

| | | | | |
|---|---|---|---|---|
| 4,616,431 A | * | 10/1986 | Dassler | A43B 13/181 36/28 |
| 4,680,876 A | * | 7/1987 | Peng | A43B 21/28 36/35 B |
| 4,887,367 A | * | 12/1989 | Mackness | A43B 1/0018 36/35 B |
| 5,222,312 A | * | 6/1993 | Doyle | A43B 13/203 36/28 |
| 5,406,719 A | * | 4/1995 | Potter | A43B 13/203 36/35 B |
| 5,537,762 A | * | 7/1996 | Walters | A43B 13/203 36/3 R |
| 6,430,843 B1 | * | 8/2002 | Potter | A43B 13/203 36/43 |
| 7,726,042 B2 | * | 6/2010 | Meschan | A43B 21/30 36/35 R |
| 11,134,750 B2 | * | 10/2021 | Li | A43B 13/20 |
| 11,206,895 B2 | * | 12/2021 | Hopkins | A43B 13/189 |

* cited by examiner

*Primary Examiner* — Sharon M Prange

(57) ABSTRACT

A shock absorption shoe, having a sole and at least one shock absorption module each having an outer shell, an inner core, an air cushion cylinder and a bottom cover, and each being connected to an air tube. The inner core is sleeved into a cavity of the outer shell from the top. A position limiting structure is provided between the inner core and the cavity. The air cushion cylinder is sleeved within the cavity. The bottom cover covers the bottom of the cavity. The shoe has a bottom layer, a middle layer and a top layer; the middle layer contains at least one mounting hole for mounting the at least one shock absorption module. The air tube is in an air tube groove on the middle layer, and one end of which is connected to the air cushion cylinder while another end is connected with a nozzle.

4 Claims, 8 Drawing Sheets

SHOCK ABSORPTION SHOE HAVING AT LEAST ONE INFLATABLE SHOCK ABSORPTION MODULE HIDDEN INSIDE THE SHOE IN WHICH AIR PRESSURE IS ADJUSTABLE

BACKGROUND OF THE INVENTION

The present invention relates to the technical field of shoes, and more specifically relates to an air cushion shock absorption shoe.

Currently, shock absorption shoes sold in the market mainly fall within the following three categories: The first one, characterized by the shoes from the US company NIKE®, provides a kind of air cushion shock absorption shoe in which the air cushion is made integrally with the sole; however, the air cushion of this kind of shoe has fixed air pressure and density and cannot be adjusted according to practical needs. The second one achieves shock absorption effect by modifying the material of the sole so that the sole is deformable to a certain extent and thus achieves buffering function (e.g. sport shoes from Adidas® in which the soles are made of foam materials); however, the sole of this kind of shoe also has fixed and non-adjustable flexibility. The third one provides a kind of shoe configured with a spring within the heel, and the insole of the shoe presses against the spring, so that when the heel of the foot of a user presses against the heel of the shoe, resilience of the spring may achieve the shock absorption effect; but likewise, the spring is fixedly mounted inside the sole, and when a user wears this kind of shoe, the resilience of the spring cannot be adjusted according to practical needs.

The aforementioned shoes provide partial solutions to shock absorption at the sole and protection of the user's ankles, however, during actual use, the weights, heights, and sizes of the foot of each user are not proportionally related. In other words, even if the size of the shoe fits the user's foot, only the user knows whether the shock absorption mechanism provided at the sole or heel meets the need of the body weight. The manufacturer of the shoe does not know and cannot precisely control the buffering effect of the shoe. In actual use, the lower limbs of the user can only be best protected by the shock absorption effect of the shoe only when the shock absorption effect (or in other words, the buffering effect) of the shock absorption mechanism of the shoe correspond to the body weight of the user. Obviously, the three kinds of shoes mentioned above are not provided with any structural designs that enable users to adjust the shock absorption effect of the shock absorption mechanism according to practical needs. In other words, the three kinds of shoes mentioned above do not allow users to select or adjust the shock absorption effect of the shoe according to different sports activities to provide shock absorption effect good enough for satisfactory protection as well as satisfactory movements of the ankle and lower limbs of the user during sports activities. Therefore, all the three kinds of shock absorption shoes described above do not allow shock absorption effect to be adjusted according to practical needs, thereby failing to provide user with any choice of selecting different shock absorption effects, and thus failing to achieve satisfactory protection of the ankle and lower limbs of the user.

BRIEF SUMMARY OF THE INVENTION

In view of the aforesaid disadvantages now present in the prior art, the present invention provides a shock absorption shoe having inflatable shock absorption modules hidden inside the shoe and in which air pressure is adjustable according to practical needs. The shoe according to the present invention allows user to select an amount of air to be pumped into the inflatable shock absorption modules according to comfortability or the own body weight of the user. In this case, the shock absorption and buffering effect of the shoe can be attained or improved, so that the foot of the user wearing the shoe according to the present invention is given with satisfactory shock absorption effect and movement capacity, thereby fulfilling the needs of the user in different occasions. Also, since the inflatable shock absorption modules are completely hidden inside the sole, the outer appearance as well as shoe fashion and design will not be affected. Pumping air in and out is easy and simple, and the shoe provided by the present invention has good shock absorption and protective effects to effectively protect the ankle and lower limbs of the user, thereby significantly lowering the risk of injury of the ankle and lower limbs during sports activities.

The present invention is achieved as follows: A shock absorption shoe, comprising a sole and at least one inflatable shock absorption module provided at the sole; characterized in that, each of said at least one inflatable shock absorption module comprises an outer cylindrical shell, an inner cylindrical core, an air cushion cylinder and a bottom cover, and is connected to an air tube; the outer cylindrical shell is provided with an inner cavity; a cross sectional diameter of the air cushion cylinder is smaller than a cross sectional diameter of the inner cavity; the inner cylindrical core is sleeved into an upper end of the inner cavity; a position limiting structure is provided between the inner cylindrical core and the inner cavity to prevent disengagement of the inner cylindrical core from the inner cavity; the air cushion cylinder is sleeved within the inner cavity below a bottom end of the inner cylindrical core; the bottom cover covers a bottom end of the inner cavity so as to limit the air cushion cylinder to be mounted inside the inner cavity; the sole comprises an anti-slip bottom layer, a middle layer, and an insole top layer; the middle layer is provided with at least one mounting hole in which said at least one inflatable shock absorption module is mounted; said at least one inflatable shock absorption module is sleeved inside and fixedly mounted into said at least one mounting hole respectively via the outer cylindrical shell; the air tube is arranged inside an air tube groove provided on the middle layer; one end of the air tube is connected with the air cushion cylinder of said at least one inflatable shock absorption module; another end of the air tube is connected with a nozzle that allows air to be pumped in and out of said at least one inflatable shock absorption module; the nozzle is embedded inside a side surface of the middle layer with an end of the nozzle exposed therefrom; the anti-slip bottom layer is fixed to a bottom surface of the middle layer, so as to hide a bottom end of said at least one inflatable shock absorption module inside the sole; the insole top layer is provided on a top surface of the middle layer; a bottom surface of the insole top layer is connected to a top end of the inner cylindrical core of said at least one inflatable shock absorption module.

Further, guiding grooves are longitudinally arranged along a side wall of the inner cavity; an outer side wall of the inner cylindrical core is correspondingly provided with position limiting and sliding blocks; the position limiting and sliding blocks engage with the guiding grooves respectively; screw holes are opened at an outer side wall of the outer cylindrical shell; the screw holes extend from the outer side wall of the outer cylindrical shell, through the outer cylindrical shell, and to the guiding grooves respectively; countersunk screws are screwed into the screw holes respectively; the countersunk screws are screwed in such that inner ends of the countersunk screws are positioned within the guiding grooves respectively and above the position limiting and sliding blocks respectively, thereby constituting a position limiting structure of the position limiting and sliding blocks so as to limit the inner cylindrical core within the inner cavity to prevent the inner cylindrical core from being disengaged from the inner cavity.

Further, a top end of the air cushion cylinder is provided with a top ring; buckling holes are provided at an outer side wall of the top ring; the bottom end of the inner cylindrical core is also provided with buckles; the bottom end of the inner cylindrical core is buckled to the buckling holes via the buckles and thus connect with the top end of the air cushion cylinder.

Further, an inner periphery of the bottom end of the inner cavity is provided with inner threads; the bottom cover is correspondingly provided with an outer threaded portion; the outer threaded portion of the bottom cover is threadedly connected with the inner threads of the inner cavity such that the bottom cover is fixedly mounted to a bottom end of the outer cylindrical shell; also, a tool hole is provided in the middle of an outer bottom surface of the bottom cover; a layer of bonding agent is also provided between an end surface of the outer threaded portion and a bottom end surface of the air cushion cylinder.

The present invention has the following beneficial effects: The shock absorption shoe according to present invention provides at least one inflatable shock absorption module each formed by an outer cylindrical shell, an inner cylindrical core, an air cushion cylinder, and a bottom cover, and also connected to an air tube. Also, the present invention provides structural configurations according to which said at least one inflatable shock absorption shoe is mounted inside the sole of shoe and thus being hidden by the sole. Accordingly, the present invention on one hand facilitates a user to select the amount of air to be pumped into said at least one shock absorption module according to his own comfort while wearing the shoe or according to his own body weight, thereby attaining or improving the shock absorption and buffering effect of the shoe such that the foot of the user can be provided with satisfactory shock absorption effect and movement capacity, thereby fulfilling the needs of the user in different occasions; also the present invention provides a nozzle resembling the one used with the valve core of a basketball to pump air in and out from said at least one shock absorption module like how it is done to a basketball; therefore pumping air in and out is simple and convenient, and hence the shoe according to the present invention has good shock absorption and protection effect to effectively achieve safety protection of the ankle and the lower limbs of the user, thereby significantly reducing the risk of injury of the ankle and lower limbs during sports activities. On the other hand, the structural configurations that enable said at least one shock absorption module to be completely hidden inside the sole will not in any way affect the outer appearance of the shoe and its fashion and design while using said at least one shock absorption module, thereby providing great convenience to manufacturers to design and manufacture different styles of shoes for consumers to choose and purchase according to their own preferences. The present invention has a scientific structural design as well as simple assembling structures facilitating easy processing and assembly.

DETAILED DESCRIPTION OF THE INVENTION

Figure 1:
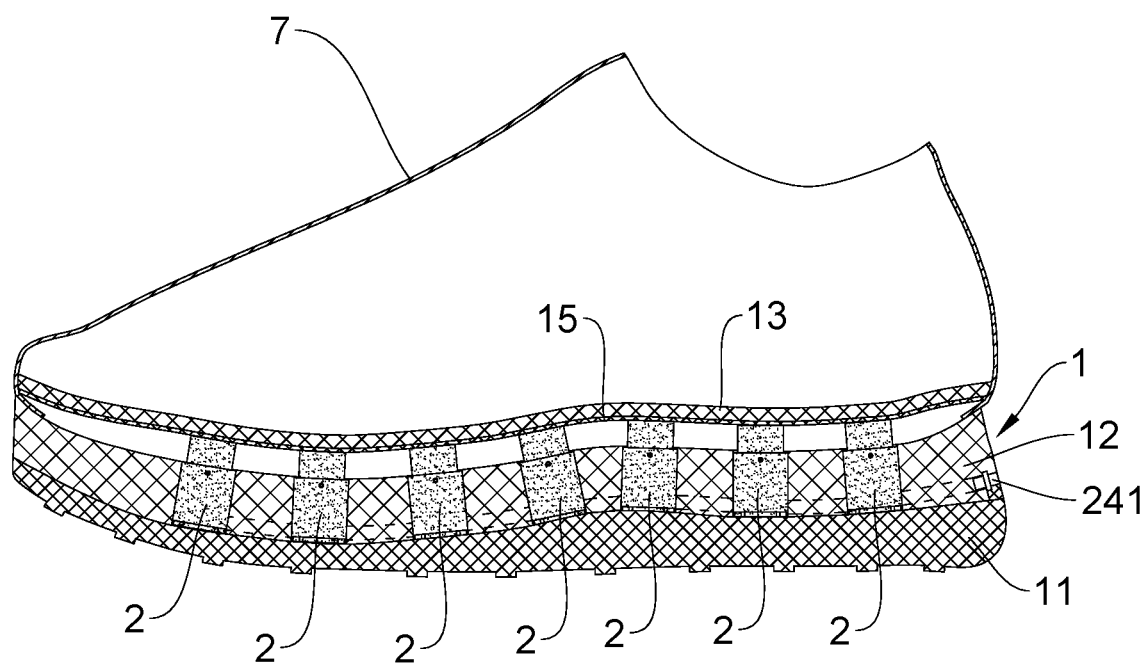
FIG. 1 is a sectional structural view according to the first embodiment of the present invention.
Figure 2:
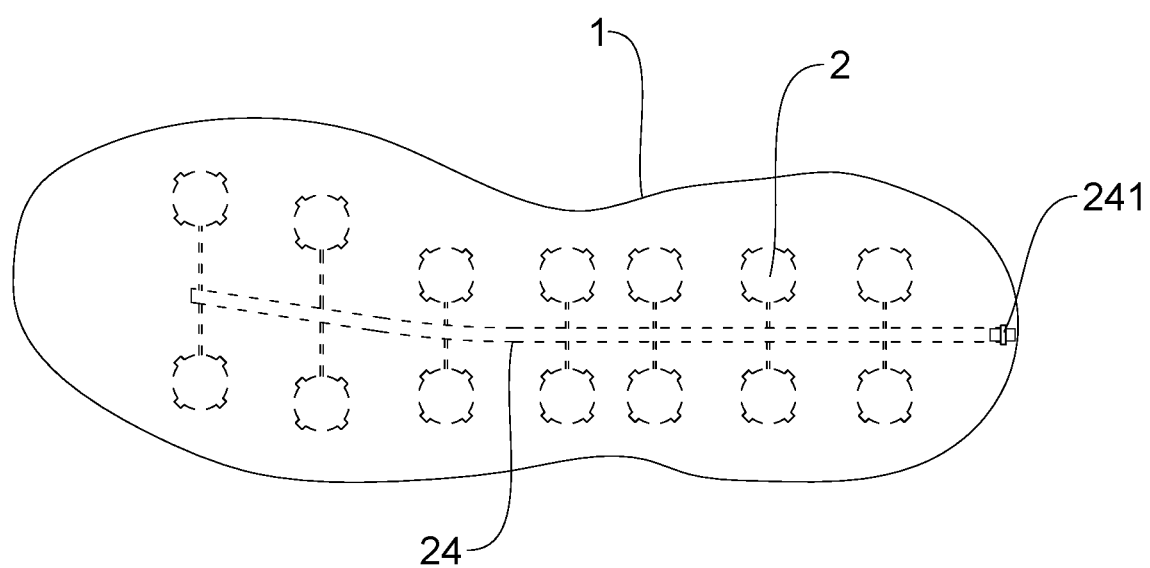
FIG. 2 is a schematic illustration from the bottom showing partially the internal arrangements of the structures according to the first embodiment of the present invention.
Figure 4:
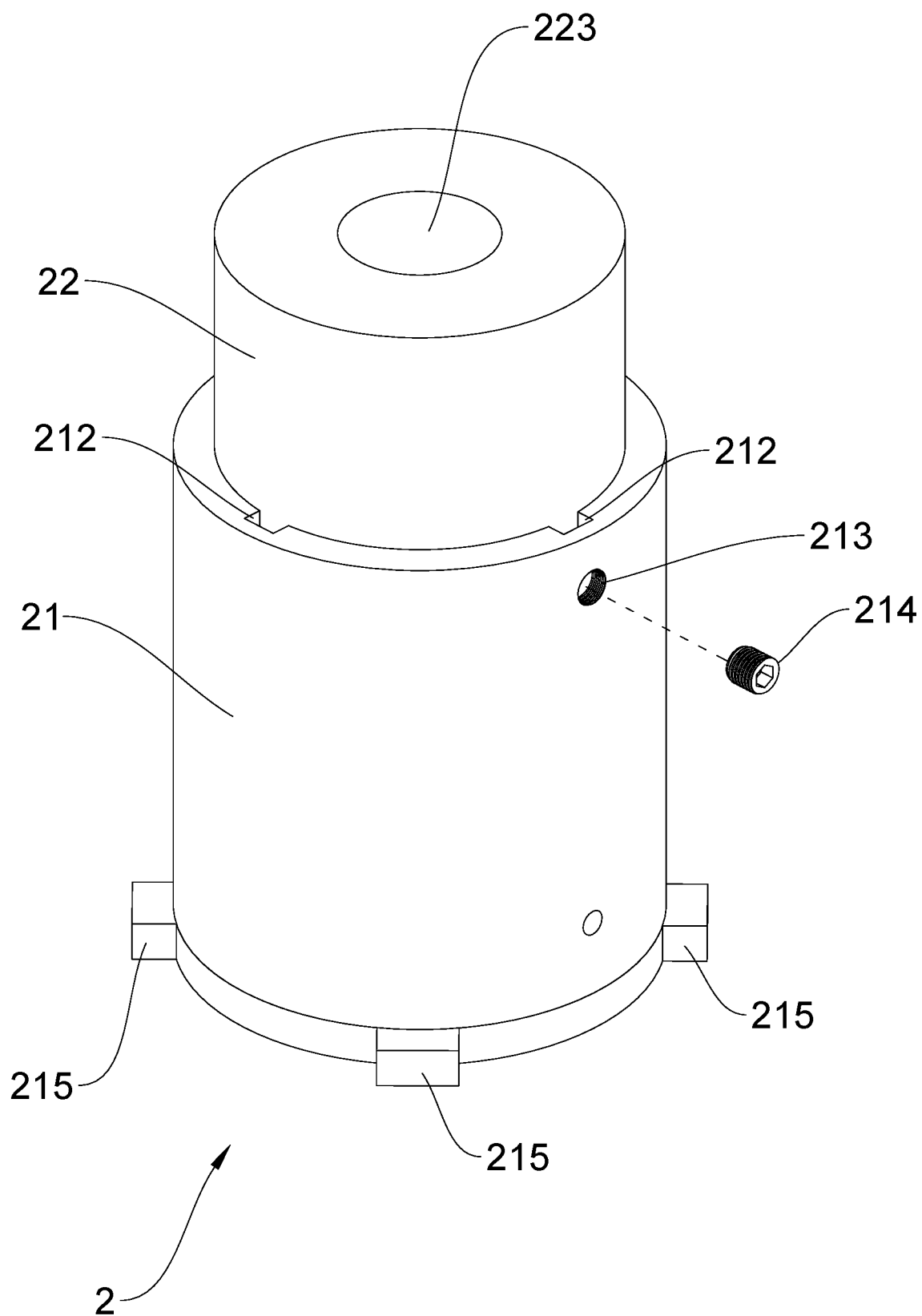
FIG. 4 is a perspective structural view of an inflatable shock absorption module of the present invention.
Figure 5:
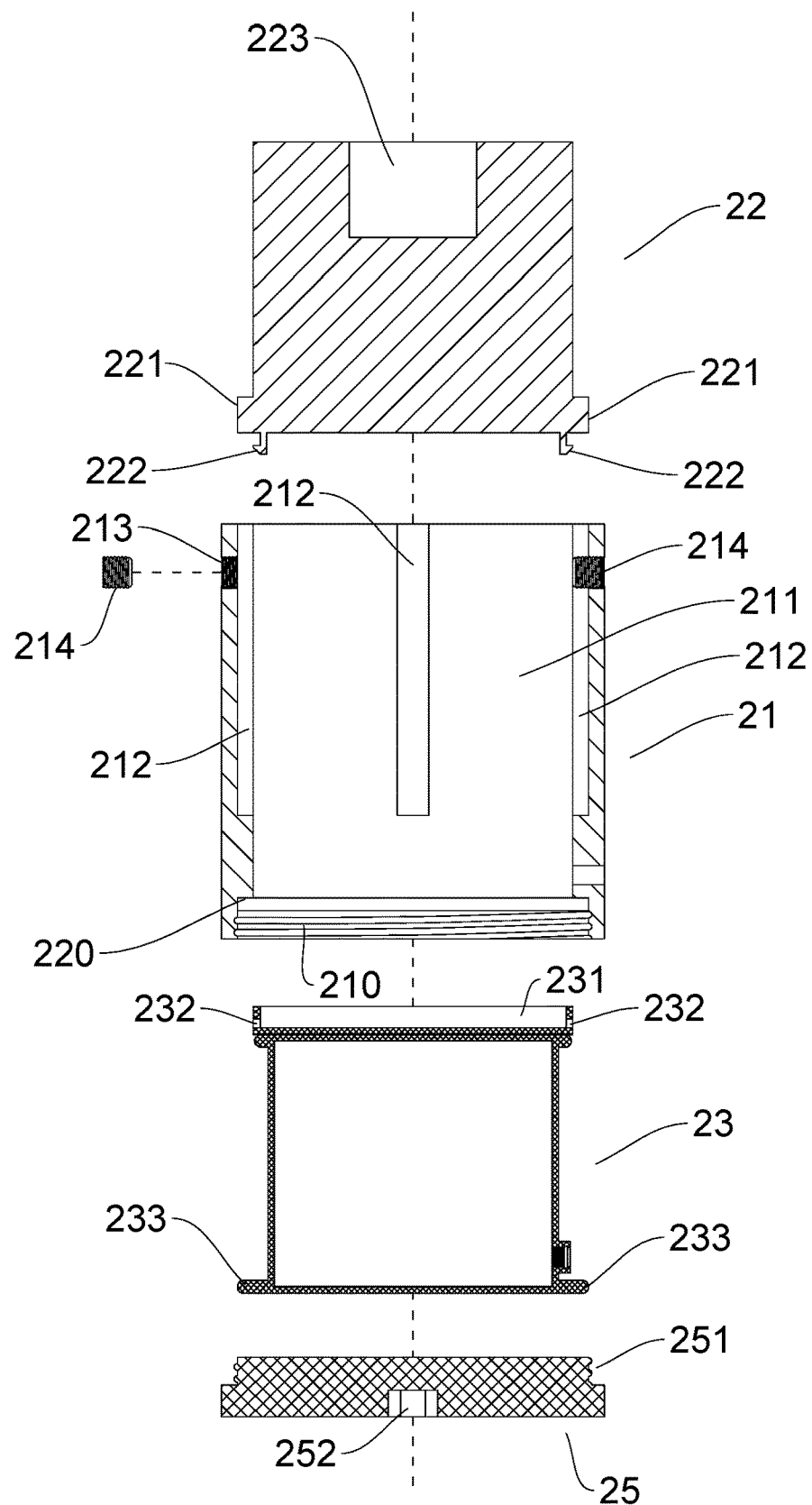
FIG. 5 is a sectional exploded structural view of the inflatable shock absorption module of the present invention.
Figure 6:
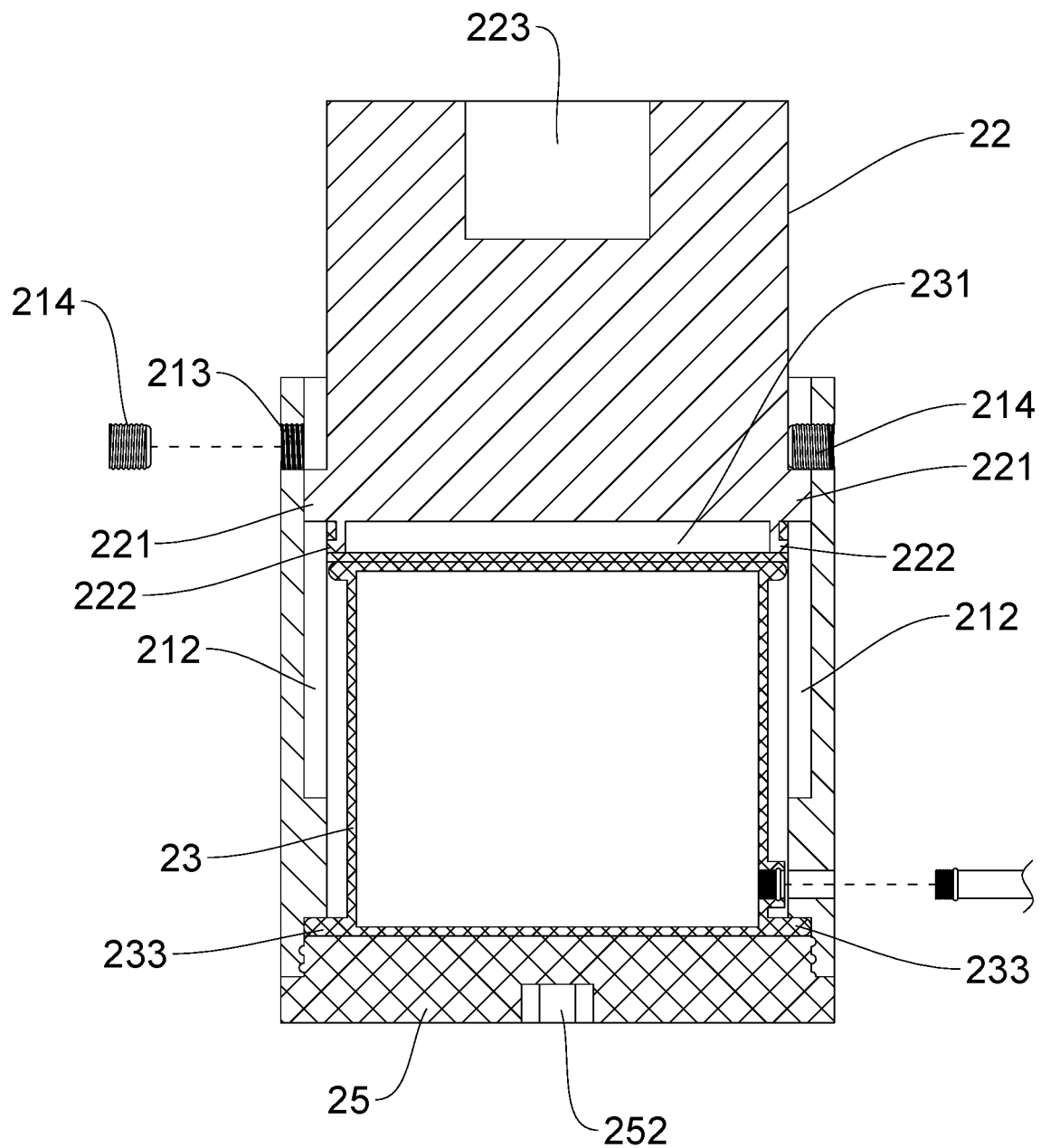
FIG. 6 is a sectional structural view of the inflatable shock absorption module of the present invention pumped up with air.
Figure 7:
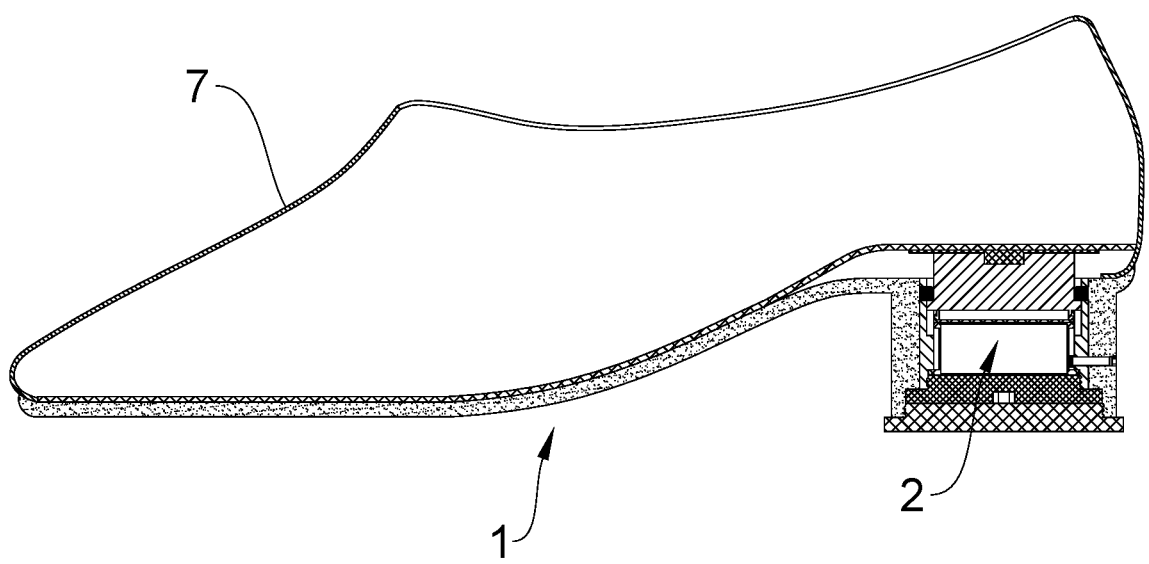
FIG. 7 is a sectional structural view according to a second embodiment of the present invention.

As shown in FIG. 1, FIG. 2 or FIG. 7, the shock absorption shoe according to the present invention comprises a sole 1 and inflatable shock absorption modules 2 provided at the sole 1, and also comprising a shoe upper 7 on the sole 1 to form a complete shoe profile, and also comprising other components like shoe laces on the shoe upper 7. To fulfill the objects of the present invention, each of the inflatable shock absorption modules 2 of the present invention as shown in FIGS. 4-6 comprises an outer cylindrical shell 21, an inner cylindrical core 22, an air cushion cylinder 23 and a bottom cover 25; and is connected to an air tube 24; the outer cylindrical shell 21 is provided with an inner cavity 211; a cross sectional diameter of the air cushion cylinder 23 is smaller than a cross sectional diameter of the inner cavity 211, so that the air cushion cylinder 23 is provided with a gap that allows the air cushion cylinder 23 to deform and expand inside the inner cavity 211 so as to achieve better shock absorption effect; also, the present invention configures the air cushion cylinder 23 inside the inner cavity 211 so that during use of the present invention, the air cushion cylinder 23 will not be damaged due to deformation of the sole; the air cushion cylinder 23 is always operated inside a closed space inside the inner cavity free from external damages, thereby ensuring its service life and reliability. The inner cylindrical core 22 is sleeved into an upper end of the inner cavity 211; a position limiting structure is provided between the inner cylindrical core 22 and the inner cavity 211 so that the inner cylindrical core 22 will not be disengaged from the inner cavity 211; the position limiting structure is provided such that the inner cylindrical core 22 will not be disengaged from the inner cavity 211, so that the inner cylindrical core 22 can only move up and down inside the inner cavity 211; the air cushion cylinder 23 is sleeved within the inner cavity 211 below a bottom end of the inner cylindrical core 22; the bottom cover 25 covers a bottom end of the inner cavity 211 so as to limit the air cushion cylinder 23 to be mounted inside the inner cavity 211.

Figure 3:
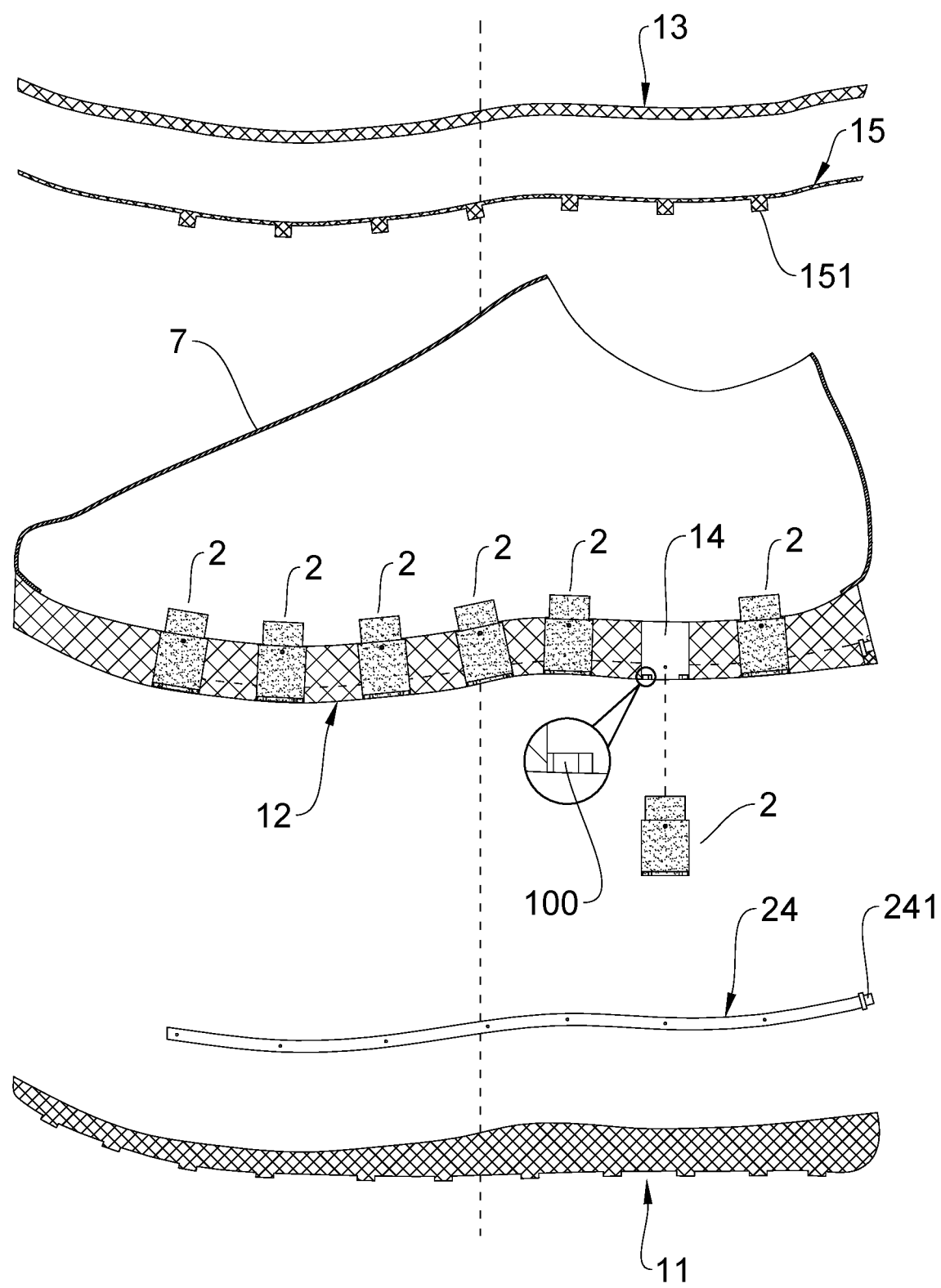
FIG. 3 is a sectional exploded structural view according to the first embodiment of the present invention.

As shown in FIG. 1 and FIG. 3, the sole 1 comprises an anti-slip bottom layer 11, a middle layer 12, and an insole top layer 13; the middle layer 12 is provided with mounting holes 14 in which the inflatable shock absorption modules 2 are mounted; the inflatable shock absorption modules 2 are sleeved inside and fixedly mounted into the respective mounting holes 14 at the middle layer 12 via the outer cylindrical shells 21; the air tube 24 is arranged inside an air tube groove provided on the middle layer 12; one end of the air tube 24 is connected with the air cushion cylinders 23 of the inflatable shock absorption modules 2; another end of the air tube 24 is connected with a nozzle 241; the nozzle 241 is embedded inside a side surface of the middle layer 12 with an end of which exposed therefrom, as shown in FIG. 1 and FIG. 2. The specific structures and working principle of the nozzle 241 are prior art which a person skilled in the art can know by reference to the nozzle on a basketball. An electronic pump or a hand pump can be used together with a pin to pump air into the inflatable shock absorption modules 2 through the nozzle 241, and the pin can also be used to release air from the inflatable shock absorption modules through the nozzle 241; pumping of air in and out of the inflatable shock absorption modules 2 through the nozzle 241 is carried out similar to the way of pumping air in and out of a basketball. As such, the object of adjusting air pressure according to personal feeling and comfortability can be achieved. Of course, the electronic pump or the hand pump can be used to vacuum air out of the inflatable shock absorption modules 2 such that the shoe of the present invention becomes a common shoe without any air cushion shock absorption effect. As shown in FIG. 1, the anti-slip bottom layer 11 is fixed to a bottom surface of the middle layer 12, so as to hide the bottom ends of the inflatable shock absorption modules 2 inside the sole 1; the anti-slip bottom layer 11 is generally bonded with the middle layer 12 by glue. The insole top layer 13 is provided on a top surface of the middle layer 12; a bottom surface of the insole top layer 13 is connected to top ends of the inner cylindrical cores 22 of the inflatable shock absorption modules. Accordingly, the present invention hides the inflatable shock absorption modules 2 completely inside the sole, and so the use of the inflatable shock absorption modules 2 by the present invention will not in any aspect affect the outer appearance of the shoe or the shoe fashion and design. Hence, the present invention can very conveniently facilitate different manufacturers to design and produce different styles of shoes for consumers to choose and purchase according to their own preferences.

In order that a bottom end of the outer cylindrical shell 21 can be more firmly mounted between the anti-slip bottom layer 11 and the middle layer 12 to prevent the same from getting loose or rotating, FIG. 4 illustrates position limiting protrusions 215 provided around an outer periphery of the bottom end of the outer cylindrical shell 21; an inner surface of a bottom end of each of the mounting holes 14 is correspondingly provided with slots 100; when the outer cylindrical shell 21 is inserted into a respective mounting hole 14, the position limiting protrusions 215 around the outer periphery of the bottom end of the outer cylindrical shell 21 engage correspondingly with the slots 14 of the respective mounting hole 14, so that the bottom end of the outer cylindrical shell 21 can be more firmly mounted between the anti-slip bottom layer 11 and the middle layer 12 to prevent the same from getting loose or rotating. As such, mounting of the inflatable shock absorption modules is more reliable and secured, thereby ensuring their service life.

In order that when the inner cylindrical core 22 moves up and down in the inner cavity 211, the inner cylindrical core moves stably and its mounting is easy and simple, FIG. 4 and FIG. 6 illustrates guiding grooves 212 longitudinally arranged along a side wall of the inner cavity 211 (inner side wall of the outer cylindrical shell 21); an outer side wall of the inner cylindrical core 22 is correspondingly provided with position limiting and sliding blocks 221; the position limiting and sliding blocks 221 engage with the guiding grooves 212 respectively; screw holes 213 are opened at an outer side wall of the outer cylindrical shell 21; the screw holes 213 extend from the outer side wall of the outer cylindrical shell, through the outer cylindrical shell, and to the guiding grooves 212 respectively; countersunk screws 214 are screwed into the screw holes 213 respectively; the countersunk screws 214 are screwed in such that inner ends of the countersunk screws 214 are positioned within the guiding grooves 212 respectively and above the position limiting and sliding blocks 221 respectively; as such, the countersunk screws 214 constitute a position limiting structure of the position limiting and sliding blocks 221 so as to limit the inner cylindrical core 22 within the inner cavity 211 and will not disengage from the inner cavity 211.

In order that when using the air cushion cylinder 23, the air cushion cylinder 23 will not move along with the up down movement of the inner cylindrical core 22 and in this sense reduce abrasion of a top end of the air cushion cylinder 23 and hence increase its service life, the top end of the air cushion cylinder 23 is provided with a top ring 231; buckling holes 232 are provided at an outer side wall of the top ring 231; the bottom end of the inner cylindrical core 22 are provided with buckles 222; the bottom end of the inner cylindrical core 22 is buckled to the buckling holes 232 via the buckles 222 and thus connect with the top end of the air cushion cylinder 23; likewise, an inner periphery of the bottom end of the inner cavity 211 is provided with inner threads 210; the bottom cover 25 is correspondingly provided with an outer threaded portion 251; the outer threaded portion 251 of the bottom cover 25 is threadedly connected with the inner threads 210 of the inner cavity 211 such that the bottom cover 25 is fixedly mounted to the bottom end of the outer cylindrical shell 21; also, a tool hole 252 for mounting and dismounting the bottom cover 25 is provided in the middle of an outer bottom surface of the bottom cover 25 so that a tool can be used to fix the bottom cover 25 to the outer cylindrical shell. A layer of bonding agent is also provided between an end surface of the outer threaded portion 251 and a bottom end surface of the air cushion cylinder 23, such that the bottom end surface of the air cushion cylinder 23 is bonded with the bottom cover 25, and hence the air cushion cylinder will not move randomly and accordingly, displacement and abrasion of the air cushion cylinder 23 will be reduced. Apart from using bonding agent to bond the air cushion cylinder and the bottom cover, FIG. 5 also illustrates a bottom annular flange 233 integrally formed at the bottom end of the air cushion cylinder 23; the inner periphery of the bottom end of the inner cavity 211 is also provided with a supporting stepped portion 220 above the inner threads 210, such that when the annular flange 233 is rest on the supporting stepped portion 220 and the outer threaded portion 251 of the bottom cover 25 is threadedly connected with the inner threads 210, the annular flange 233 is clamped tightly between the supporting stepped portion 220 and the outer threaded portion 251, thereby achieving the positioning and fixing of the bottom end of the air cushion cylinder 23.

In order to further increase the comfort of wearing the shoe of the present invention such that the top end of the inner cylindrical core 22 will not disturb the foot, the FIG. 1 and FIG. 3 illustrate an intermediate layer 15 provided between the middle layer 12 and the insole top layer 13; a bottom surface of the intermediate layer 15 is also provided with insertion rods 151 which are sleeved into sleeve holes 223 configured at top ends of the inner cylindrical cores 22 respectively. Also, as shown in FIG. 2, when a plural number of inflatable shock absorption modules 2 are arranged at the middle layer 12, all the inflatable shock absorption modules 2 are linked with one another, such that the up down movement of the inner cylindrical cores of these inflatable shock absorption modules 2 are also linked with one another, thereby further increasing the comfort of wearing.

Figure 8:
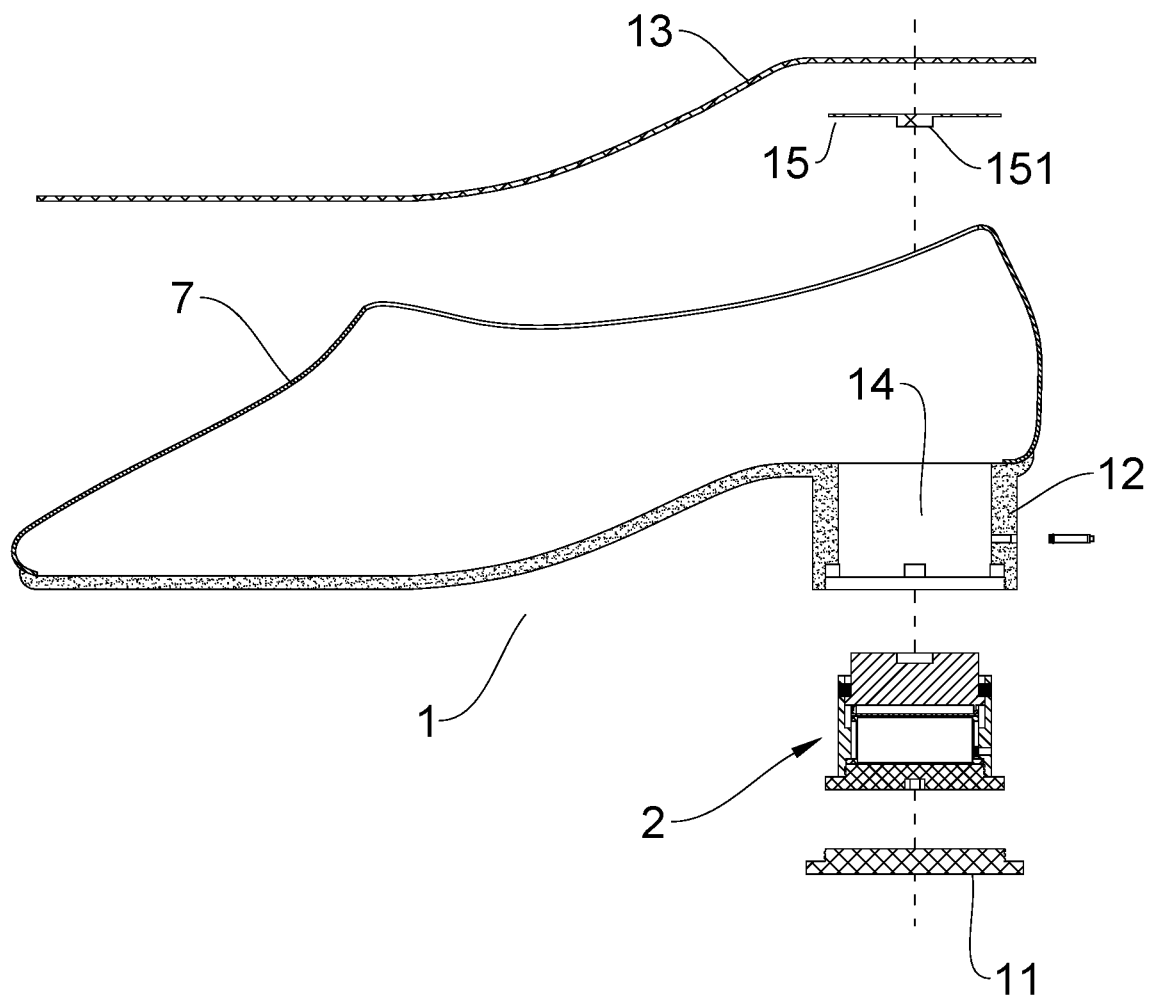
FIG. 8 is a sectional exploded structural view according to the second embodiment of the present invention.

In one embodiment, the present invention may be implemented as illustrated in FIG. 2 where the sole 1 is evenly distributed with the inflatable shock absorption modules 2. In another embodiment as shown in FIG. 7 and FIG. 8, only a single inflatable shock absorption module 2 is configured at the heel of the shoe. Different embodiments are contrived to meet different needs of the user. The present invention obtains the intended shock absorption effect by adjusting the amount of air and/or the air pressure pumped into the air cushion cylinder.

The technical solutions of the present invention are described above only as the preferred embodiments of the present invention, and should not limit the scope of protection of the present invention. It should be noted that, a person skilled in this field of art may also carry out different modifications and variations without departing from the inventive concept of the present invention, and these modifications and variations should be considered falling within the scope of protection of the present invention.

What is claimed is:

1. A shock absorption shoe, comprising a sole and at least one inflatable shock absorption module provided at the sole; characterized in that, each of said at least one inflatable shock absorption module comprises an outer cylindrical shell, an inner cylindrical core, an air cushion cylinder and a bottom cover, and is connected to an air tube;

the outer cylindrical shell is provided with an inner cavity; a cross sectional diameter of the air cushion cylinder is smaller than a cross sectional diameter of the inner cavity; the inner cylindrical core is sleeved into an upper end of the inner cavity; a position limiting structure is provided between the inner cylindrical core and the inner cavity to prevent disengagement of the inner cylindrical core from the inner cavity; the air cushion cylinder is sleeved within the inner cavity below a bottom end of the inner cylindrical core; the bottom cover covers a bottom end of the inner cavity so as to limit the air cushion cylinder to be mounted inside the inner cavity;

the sole comprises an anti-slip bottom layer, a middle layer, and an insole top layer; the middle layer is provided with at least one mounting hole in which said at least one inflatable shock absorption module is mounted; said at least one inflatable shock absorption module is sleeved inside and fixedly mounted into said at least one mounting hole respectively at the middle layer via the outer cylindrical shell; the air tube is arranged inside an air tube groove provided on the middle layer; one end of the air tube is connected with the air cushion cylinder of said at least one inflatable shock absorption module; another end of the air tube is connected with a nozzle that allows air to be pumped in and out of said at least one inflatable shock absorption module; the nozzle is embedded inside a side surface of the middle layer with art end of the nozzle exposed therefrom;

the anti-slip bottom layer is fixed to a bottom surface of the middle layer, so as to hide a bottom end of said at least one inflatable shock absorption module inside the sole; the insole top layer is provided on a top surface of the middle layer; a bottom surface of the insole top layer is connected to a top end of the inner cylindrical core of said at least one inflatable shock absorption module;

guiding grooves are longitudinally arranged along a side wall of the inner cavity;

an outer side wall of the inner cylindrical core is correspondingly provided with position limiting and sliding blocks; the position limiting and sliding blocks engage with the guiding grooves respectively; screw holes are opened at an outer side wall of the outer cylindrical shell: the screw holes extend from the outer side wall of the outer cylindrical shell, through the outer cylindrical shell, and to the guiding grooves respectively; countersunk screws are screwed into the screw holes respectively; the countersunk screws are screwed in such that inner ends of the countersunk screws are positioned within the guiding grooves respectively and above the position limiting and sliding blocks respectively, thereby constituting the position limiting structure of the position limiting and sliding blocks so as to limit the inner cylindrical core within the inner cavity to prevent the inner cylindrical core from being disengaged from the inner cavity.

2. The shock absorption shoe of claim 1, wherein a top end of the air cushion cylinder is provided with a top ring; buckling holes are provided at an outer side wall of the top ring; the bottom end of the inner cylindrical core is also provided with buckles; the bottom end of the inner cylindrical core is buckled to the buckling holes via the buckles and thus connect with the top end of the air cushion cylinder.

3. The shock absorption shoe of claim 1, wherein an inner periphery of the bottom end of the inner cavity is provided with inner threads; the bottom cover is correspondingly provided with an outer threaded portion; the outer threaded portion of the bottom cover is threadedly connected with the inner threads of the inner cavity such that the bottom cover is fixedly mounted to a bottom end of the outer cylindrical shell; also, a tool hole is provided in the middle of an outer bottom surface of the bottom cover; a layer of bonding agent is also provided between an end surface of the outer threaded portion and a bottom end surface of the air cushion cylinder.

4. The shock absorption shoe of claim 1, wherein an intermediate layer is provided between the middle layer and the insole top layer; a bottom surface of the intermediate layer is provided with at least one insertion rod which is sleeved into a sleeve hole configured at the top end of the inner cylindrical core of said at least one shock absorption module.

* * * * *